Oct. 8, 1963

L. KATZIN 3,106,703

MAGNETIC CORE ASSEMBLY

Filed Aug. 29, 1958

INVENTOR
L. KATZIN

BY

William H. Kaustra

ATTORNEY 3,106,703

MAGNETIC CORE ASSEMBLY

Leonard Katzin, Newark, N.J., assignor to Bell Telephone Laboratories, Incorporated, New York, N.Y., a corporation of New York Filed Aug. 29, 1958, Ser. No. 758,024
1 Claim. (Cl. 340—174)

This invention relates to magnetic core memory arrays and more particularly to core assembly structures and wiring methods for use in the fabrication of such memory arrays.

Magnetic memory arrays in which the individual storage elements comprise magnetic cores of the conventional toroidal type have found extensive application in information handling and computer systems where extremely large amounts of information must be accurately and speedily operated upon. One widely used form of such an array comprises a coordinate arrangement of magnetic cores which are suspended at the crosspoints of coordinate conductors threading the cores. The fabrication and threading of such an array are generally performed manually and the ultimate accuracy and reliability of the system of which the array is part will depend to a large extent on how accurately the critical assembly of the array was accomplished. Before final installation in a system is completed, each core array is tested for errors in wiring and assembly. At that time also the presence of defective or damaged cores in the array is brought to light. However, such testing has heretofore effectively been accomplished only after the entire array has been completely wired. As a result, the cost of even a minor error in wiring or the presence of a single defective core in the array may prove excessive and its correction, time consuming.

An object of the present invention is the fabrication of magnetic core memory arrays in a new and improved manner which couples a maximum of wiring accuracy with a minimum of possible core damage.

Another object of this invention is the assembly of magnetic cores in structures insuring accuracy of wiring and adapted for use as subassemblies of larger core structures.

Still another object of this invention is to make possible the ready wiring and fabrication of magnetic core memory arrays by means of machine techniques.

It is a further object of this invention to facilitate the accurate wiring of magnetic core memory arrays.

These and other objects of this invention are realized in one specific illustrative embodiment thereof comprising a mounting rack strip capable of retaining a complete row of toroidal cores of a memory array to be fabricated. One edge of the rack is provided with a plurality of longitudinal recesses each of which is capable of freely receiving a toroidal core. With each of the cores in place, a row assembly is presented in which the axes of the cores are parallel and in which a sufficient portion of the mounting rack structure at each recess location is removed such that the aperture of each core is fully accessible for threading purposes.

It is a feature of this invention that a previously threaded row of cores may be inserted into the edge recesses of the mounting rack with the threading conductor or conductors having free play in the core apertures. Each of the recesses permits the passage of the threading conductors beneath a core rim so that the conductors may emerge on the same side of the rack as that from which the core apertures are entered and the same magnetic coupling sense may thus be conveniently maintained.

It is another feature of this invention that the cores are firmly maintained in the respective rack recesses by the threading conductors which also serve as the means by which the cores are energized. A threading conductor, after passing beneath the core rim, is laced to the mounting rack by means of a catch lug provided on a side thereof before proceeding on through the aperture of the next core. By drawing the threading conductor of a row taut, each of the cores may be firmly held in its recess by the tension of the conductor against the alternating catch lugs.

It is still another feature of this invention that a core-loaded rack may advantageously present two adjacent rows of adjacent planes of a three-dimensional memory array. In this case both of the edges of the mounting rack strip have core recesses provided therein in which the cores are inserted in the manner described in the foregoing. Each row is already wired with one or more coordinate conductors and a number of mounting racks corresponding to the number of rows in the planes may be arranged edgewise such as to align the apertures of corresponding cores of the rows along common axes. With the cores so arranged the other coordinate conductors may now be readily threaded through the cores without further positioning.

Advantageously also the rack arrangement of this invention comprises a convenient subassembly which may be tested for core defects and to a large extent for wiring accuracy before final assembly of the memory array is completed. To insure ultimate wiring accuracy and also to effect a substantial reduction in time required to complete the array fabrication, the core assembly structure of this invention is ideally suited to programmed fabrication and assembly by machine. Thus, the prethreading of a stack of cores, the successive movement of the cores into the respective recesses, the lacing of the conductors about the catch lugs, and the movement of the mounting rack into its position in the array for final threading, all are clearly defined steps which may be readily performed by mechanical means.

In another illustrative embodiment of this invention the cores are again fitted in recess means provided therefor on an edge or opposite edges of the mounting rack strip and the energizing conductor is wound around the mounting strip at the same time alternately threading the cores of the two edges. By drawing the conductor taut, the cores may also be firmly seated in the recess means.

Thus, it is still another feature of this invention that the energizing conductor is also continuously wound around the mounting strip to maintain the cores in place for further wiring operations.

The present invention together with its objects and features may be better understood from a consideration of the detailed description thereof which follows when taken in conjunction with the accompanying drawing, in which.

Figures 1, 3:
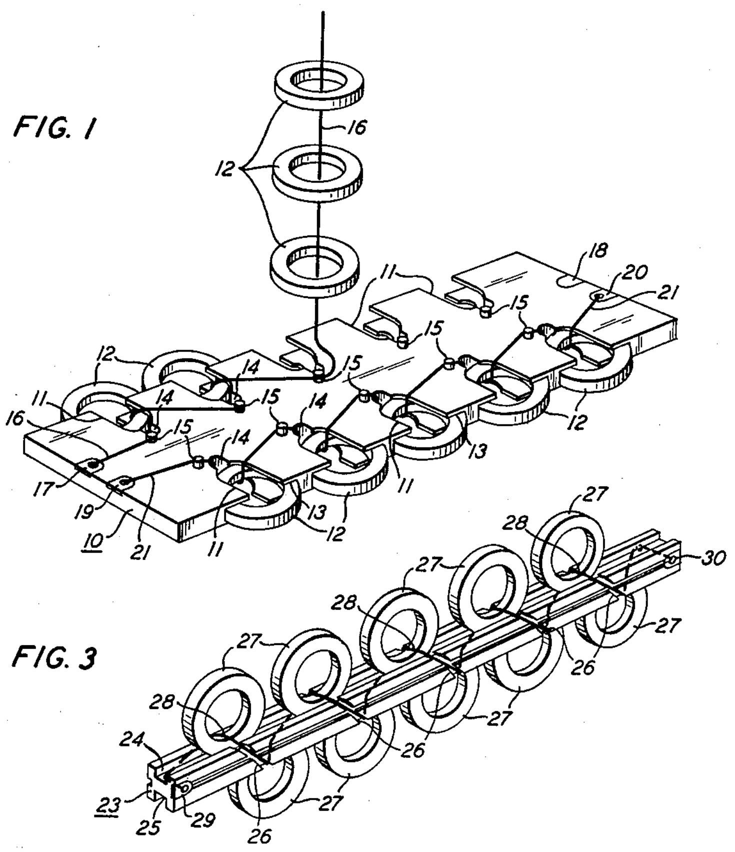
FIG. 1 shows one specific illustrative embodiment of this invention adapted to present corresponding rows of two planes of a three-dimensional array, the cores of one row being partially mounted.
FIG. 3 shows another illustrative embodiment of this invention also adapted for use in a three-dimensional array, the mounting recesses being fully loaded.

One specific embodiment according to the principles of this invention as shown in FIG. 1 comprises a flat mounting rack strip 10 of a nonmagnetic insulating material having a plurality of recesses 11 on each longitudinal edge thereof. Each of the recesses 11 is of a configuration such as to freely receive a conventional toroidal magnetic core of the particular dimensions required in the memory array of which the present assembly is to be part. In the fully assembled combination each of the recesses 11 will have fitted therein such a magnetic core 12 and each of the recesses 11 may further conveniently be flanged thereby providing overhangs 13 to facilitate the positioning of the cores 12 with respect to the upper and lower surfaces of the rack strip 10. The rack strip 10 is milled transversely at each of the recesses 11 to provide a notch 14 therein to permit passage of a conductor through the rack strip 10 beneath each core rim in the manner to be described. The mounting rack strip 10 without the cores 12 may conveniently be formed of a single molded plastic piece to reduce to a minimum the cost of the assembly.

Adjacent each of the recesses 11 on one surface of the rack strip 10 is a catch lug 15 which may be either integrally molded in the strip 10 or may be added thereto as pins set in holes provided therefor. The illustrative embodiment of FIG. 1 contemplates its employment in a three-dimensional memory array having five cores in each row. Obviously, the principles of this invention encompass assemblies having any required number of cores in a row and also their employment in memory arrays comprising only a single plane. In the latter case the mounting rack strip 10 could advantageously be formed having core receiving recesses on only one of its edges since only a single row need then be presented for final wiring.

In the assembly of the arrangement of FIG. 1 a stack of cores 12, in the present instance, five, may be prethreaded with a conductor 16 (or more than one conductor when the array wiring requirements so demand). The cores 12 are then individually fitted respectively in the recesses 11 with the conductor 16 left freely movable in the apertures of the cores in one direction and passing, also freely, beneath the core rims through the notches 14 in the other direction. As a result of this threading arrangement the conductor 16 is caused to enter the core apertures and emerge from beneath the core rims on the same side of the rack strip 10. The insertion of the cores 12 in the recesses 11 is accomplished with the strip 10 having the catch lugs 15 on the side of the threading conductor 16. Thus, after each emergence from a notch 14, the conductor 16 may be looped about a lug 15 where the conductor 16 is permanently caught. The conductor 16 is electrically secured at one end of the rack strip 10 to one terminal 17 of a terminal pair 17 and 18 provided at the ends of the strip 10, respectively. A similar terminal pair 19 and 20 is provided at the ends of the strip 10 for the core row on the other edge of the mounting strip 10. The terminals 17 through 20 may be set into the ends of the rack strip 10 in any convenient manner known in the art. The conductor 16, having in the manner described laced each of the cores 12 to the mounting rack strip 10, is drawn taut and finally electrically secured to the terminal 18 at the opposite end of the mounting rack 10.

In a similar manner, a conductor 21 also prethreaded through a five-core stack, is electrically secured at the terminals 19 and 20 to lace the cores 12 to the recesses 11 of the mounting rack strip 10 by means of another set of catch lugs 15.

Advantageously, the cores 12 of each row are most expeditiously fitted and wired with one coordinate conductor, if, as is contemplated in the foregoing description, the conductors are threaded through a core stack before assembly of the rack is begun. Such threading is readily accomplished by simply aligning the cores in a coaxial stack and a mechanical means for performing this operative step is readily devisable by one skilled in the art. The subsequent steps of fitting the cores recess by recess simultaneously in both sides of the rack strip 10 and the lacing of the conductors 16 and 21 about the catch lugs 15 are also clearly defined operations which may conveniently be accomplished by readily devisable mechanical means. Although only a single conductor has been described as threading the cores of each core row as a single coordinate conductor, obviously any reasonable number of conductors may be threaded through the cores before assembly as may be required in the particular memory array being fabricated.

Figure 2:
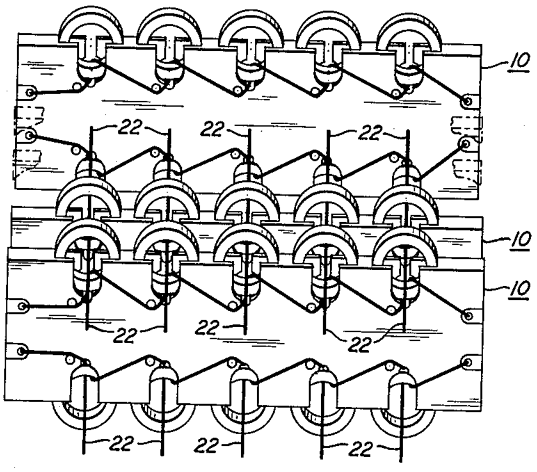
FIG. 2 shows a plurality of assemblies according to the embodiment of FIG. 1 arranged to present a two-plane array in which column conductors may be simultaneously threaded.

After the mounting rack 10 has been fully assembled and tested, the fabrication operation may proceed to the final assembly of the memory array. A number of the mounting racks 10 corresponding to the number of rows of cores required in the array are arranged edgewise with corresponding cores of the rows aligned coaxially in columns as shown in FIG. 2. The column conductors 22 may now be threaded through the coaxially arranged cores of the racks. The latter step may also be accomplished by mechanical means and, since no further positioning of the cores is necessary, this final wiring operation may be performed simultaneously for all of the columns of the plane or planes being wired.

In the arrangement just described two corresponding core rows of two planes of a three-dimensional array are presented. The same double row structure may also advantageously be employed to make up two rows of a single planar array. In this case, after the required number of mounting racks have been vertically arranged as previously described, the column conductors 22, after threading one group of rows in one direction are returned by threading the group of rows on the opposite edge of the racks 10 in the opposite direction. The column conductors 22 thus enter and emerge from the column of cores on the same side of the array and the planar array thus resulting may be thought of as having been "folded."

In FIG. 3 is shown another illustrative embodiment of this invention comprising a nonmagnetic insulating mounting rack strip 23 having the individual core recesses generalized as single longitudinal slots 24 and 25 on two edges of the rack strip 23. A groove 26 is cut in a helical manner about the rack strip 23 for its entire length, the pitch of which helical groove corresponds to the spacing of the cores to be retained by the rack strip 23. The rack strip 23 may also be of a molded plastic construction as was the case for the rack strip 10 of FIG. 1. An apertured magnetic core 27 is fitted longitudinally in each of the slots 24 and 25 at each intersection of the latter slots and the helical groove 26. With all of the cores 27 in place, a conductor 28 is alternately threaded through the cores of the two edges of the rack strip 23 and snugly wound around the strip 23 in the groove 26, the latter groove being of a dimension to receive the particular conductor used in the memory array being fabricated. By drawing the conductor 28 taut the cores are advantageously firmly secured in position at the recess points defined by the slots 24 and 25 and the groove 26. The conductor 28 is electrically secured at each end to terminals 29 and 30 set in the respective ends of the rack strip 23. Although only a single conductor 28 is shown as threading the cores 27 and winding about the strip 23, more than one conductor may be so threaded. In such a case additional helical grooves paralleling the groove 26 are cut in the length of the rack strip 23 to receive the additional conductor. Since the conductor 28 serially threads the cores 27 of both edges of the rack strip 23, the illustrative assembly of FIG. 3 as specifically described presents a single row of a planar array, with the cores thereof alternating on the two edges of the strip 23.

What have been described are considered to be only illustrative embodiments according to the principles of the present invention and it is to be understood that numerous other arrangements may be devised by one skilled in the art without departing from the spirit and scope thereof.

What is claimed is:

A magnetic core assembly comprising a nonmagnetic mounting rack strip having a plurality of longitudinal recesses on an edge thereof, a like plurality of notches in said rack strip and a like plurality of catch lugs, each of said notches being immediately contiguous to a different one of said recesses, each of said catch lugs being mounted on one side of said rack strip adjacent a different one of said recesses, a plurality of magnetic cores each fitted in a different one of said recesses, and means for retaining said cores in said recesses including a conductor threading each of said cores from said one side of said rack strip, returning through said associated contiguous rack strip notch to said one side and secured on said one side to said associated catch lug.

References Cited in the file of this patent

UNITED STATES PATENTS

| | | |
|---|---|---|
| 2,823,360 | Jones | Feb. 11, 1958 |
| 2,823,371 | Jones | Feb. 11, 1958 |
| 2,823,372 | Jones | Feb. 11, 1958 |
| 2,823,373 | Consalvi | Feb. 11, 1958 |
| 2,871,547 | Huggins | Feb. 3, 1959 |
| 2,877,540 | Austen | Mar. 17, 1959 |
| 2,934,748 | Steimen | Apr. 26, 1960 |
| 3,008,130 | Devaud et al. | Nov. 7, 1961 |

FOREIGN PATENTS

| | | |
|---|---|---|
| 562,214 | Italy | May 8, 1957 |